INVENTORS
WILLIAM G. JEAKLE
JACK F. ENGLE

BY Robert V. Jambor
ATTORNEY

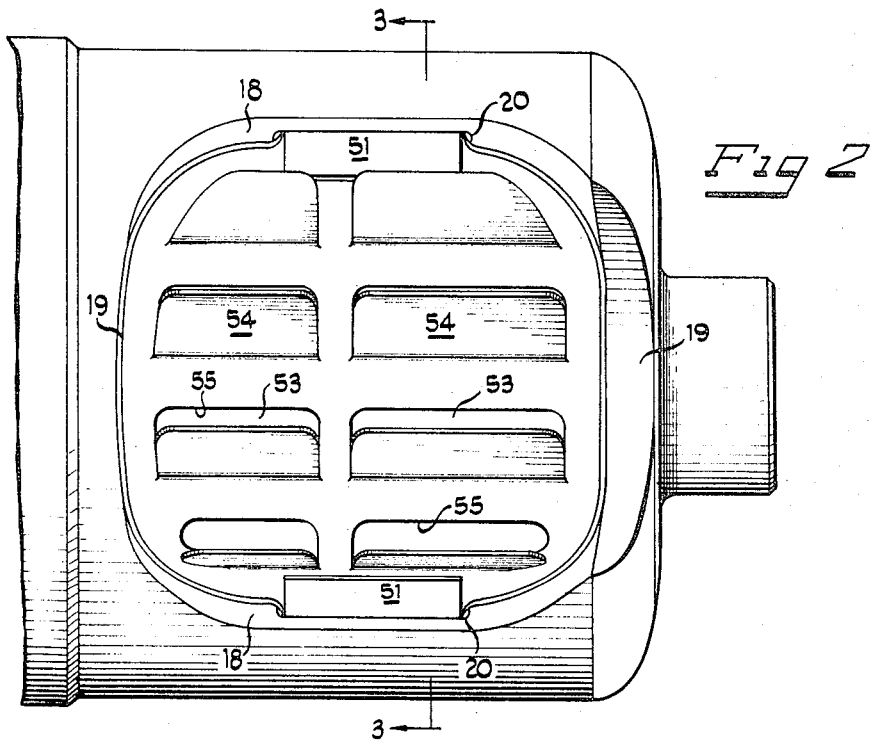
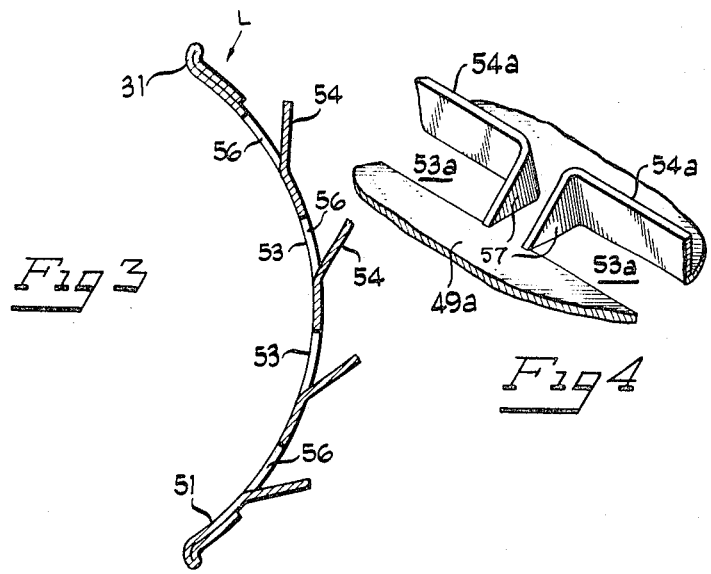

United States Patent Office 3,429,400
Patented Feb. 25, 1969

3,429,400
DIFFERENTIAL MECHANISM
Jack F. Engle and William G. Jeakle, Auburn, Ind., assignors to Borg-Warner Corporation, Chicago, Ill., a corporation of Illinois
Filed Dec. 2, 1966, Ser. No. 598,825
U.S. Cl. 184—11        11 Claims
Int. Cl. F01m 9/06; F16n 7/26; F16h 1/44

ABSTRACT OF THE DISCLOSURE

A limited slip differential mechanism including a lubrication delivery arrangement connected to the differential casing in overlying relation to a side port opening. The lubrication delivery arrangement includes at least one aperture formed therein and a lubricant scoop adjacent the aperture extending outwardly of the casing.

---

This invention relates to differential mechanisms. More particularly, it relates to differential mechanisms of the limited-slip type which include an arrangement for supplying lubricant to the internal elements of the mechanism.

Limited-slip differential mechanisms found in common usage in automotive vehicles generally include one or more clutches which provide the necessary restraint to differential action. These clutches are, at times, subjected to heavy loading and adequate lubrication and cooling is essential to prolonged service life.

In a conventional drive axle arrangement lubricant which is usually present in an outer housing surrounding the mechanism is allowed to enter the mechanism casing through a relatively large side port opening. This lubricant passes through the mechanism and lubricates the relatively rotating surfaces of the internal elements and additionally dissipates heat generated by frictional engagement.

Use of the side port opening for lubricant supply is, under most circumstances satisfactory. However, it has been found that with certain types of limited-slip differential mechanisms, and under certain operating conditions the quantities of lubricant available are not adequate. This is especially true at higher axle velocities since centrifugal force retards the free entry of lubricant through the side port opening.

It is apparent, therefore, that an arrangement which insures the delivery of adequate supplies of lubricant is a significant advancement in the development of limited-slip differential mechanism design. The present invention is directed to such an arrangement. Very generally, the arrangement of the present invention includes a system of lubricant scoops associated with the mechanism side port openings which are effective to direct lubricant into the cavity defined by the mechanism casing. By this arrangement proper lubrication and cooling of internal components is assured.

Particular objects and advantages of the present invention will become more readily apparent with reference to the following description and accompanying drawings.

In the drawings:

FIGURE 2 is a plan view of the apparatus of FIGURE 1 illustrating various other features of the invention.

FIGURE 3 is a sectional view of a portion of the apparatus of FIGURE 1 taken substantially along the line 3—3 of FIGURE 2.

FIGURE 4 is a fragmentary view of a slightly modified form of the invention.

Figure 1:
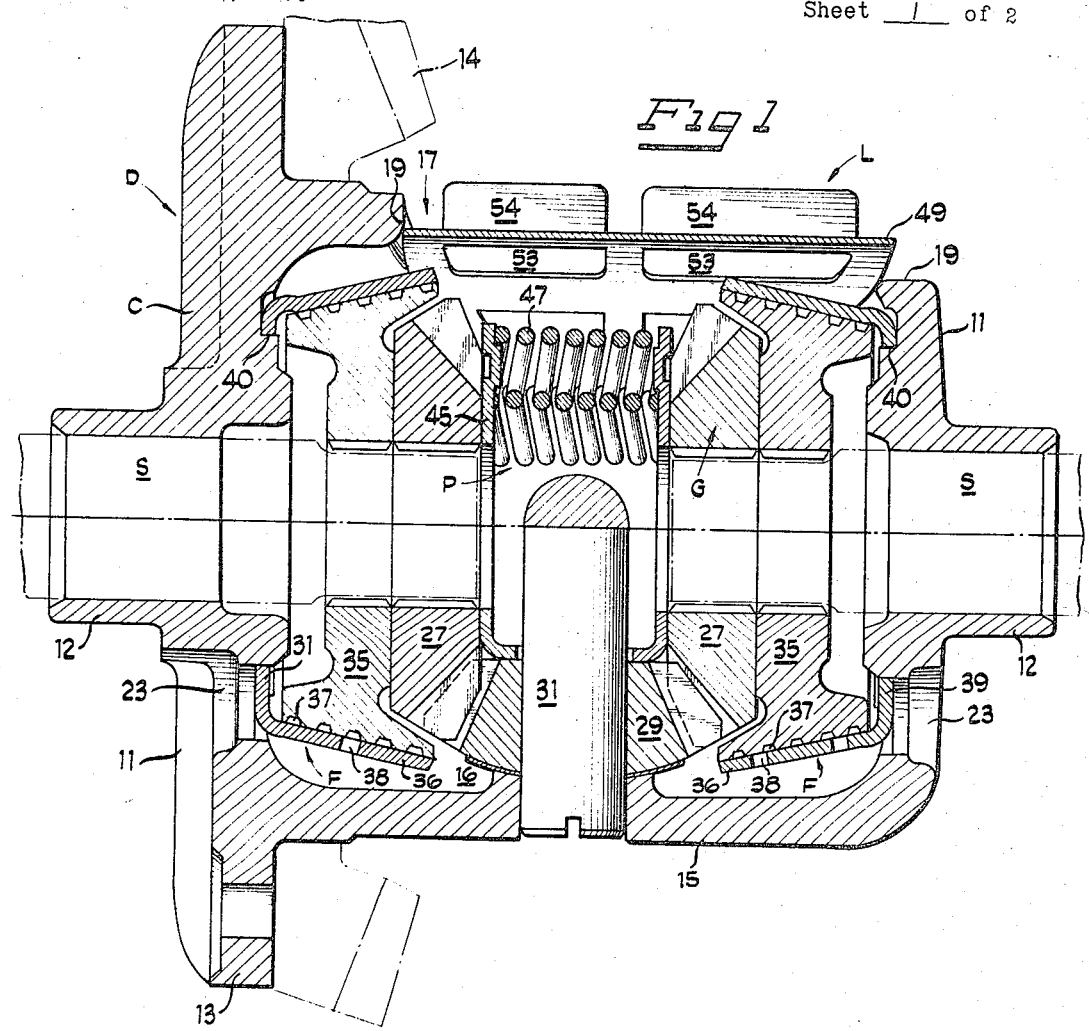
FIGURE 1 is a revolved sectional view of a differential mechanism illustrating various features of the present invention.

Referring now to FIGURE 1, there is shown a differential mechanism generally designated D which is illustrative of one embodiment of the invention. The mechanism D is shown in operative association with a pair of co-axially aligned, relatively rotatable output shafts S which form the driving axle of an automotive or commercial vehicle, farm tractor or other device.

The differential mechanism illustrated is similar to the differential mechanism shown and described in United States application for Letters Patent Ser. No. 475,808, filed July 29, 1965 and now Patent No. 3,227,557 by Spencer H. Mieras. It includes a casing C which is disposed in surrounding relation to adjacent ends of the output shafts S, a bevel gear system G, a pair of friction clutches F, and a spring biasing arrangement P. Additionally, the mechanism D of the illustrated embodiment includes a lubrication supply arrangement generally designated L which is effective to provide adequate supplies of lubricant to the internal elements of the mechanism.

More specifically and as best seen in FIGURE 1, the differential casing C of the illustrated embodiment is an integrally formed casting and may be constructed of any suitable material such as malleable iron. The casing C includes a pair of transverse spaced apart generally parallel walls 11 each of which includes a longitudinally elongated hub 12 adapted to receive one of the output shafts S. One of the transverse walls 11 is provided with a radially directed flange 13 adapted to receive a ring gear such as the ring gear 14 shown in phantom which receives input torque from an associated drive line system (not shown). The transverse walls 11 are connected by a longitudinally extending generally cylindrical wall 15 which with the transverse walls defines an internal cavity 16 surrounding the adjacent ends of the output shafts.

The cylindrical wall 15 includes a side port 17 defined by surfaces 18 which extend generally parallel to the mechanism centerline and surfaces 19 which extend generally transverse to the mechanism centerline. Each of the surfaces 18 is provided with a slot 20 which is elongated in the axial axle direction. The purpose of these slots will become apparent shortly.

A plurality of longitudinally directed end ports 23 are provided in each of the transverse walls 11. These ports define a flow path for movement of lubricant out of the mechanism so that a continuous flow of cooling lubricant may be provided.

The bevel gear system G best seen in FIGURE 1 include a frusto-conical clutch member 35 and an asso- one of the shafts S for rotation therewith and axial movement thereon. These side gears are in constant mesh with a pair of pinion gears 29 supported by a transversely extending pinion pin 31 secured to the casing C in a position generally normal to the mechanism centerline.

Differential action provided for by the bevel gear system G is resisted by the clutches F. These clutches include a frusto-conical clutch member 35 and an associated conical seat defined by insert 36. Resistance to differential action is accomplished by the frictional engagement of the conical clutch member with the conical seat surface defined by the insert.

A spirally progressing groove 37 is provided in the conical seat surface of each of the clutch members 35 which provides for distribution of lubricant across the frictionally engaged conical surfaces of the clutch member and insert 36.

Each clutch member 35 includes an integrally splined bore connected to one of the shafts S. The clutch member therefore is rotatable with the associated shaft and is additionally axially movable with respect to the shaft.

The insert 36 which defines the conical seat surface frictionally engaged by the clutch member 35 made of any suitable highly wear resistant material such as steel and may be formed by any suitable means such as by stamping, spinning or other manufacturing process. Lubricant orifices 38 are provided in the inserts to improve the lubrication distribution characteristics of the frictionally engaged surfaces.

As best seen in FIGURE 1, each insert is secured to the differential mechanism casing at one of the transverse walls 11. In the illustrated embodiment this connection is effected by radially inwardly directed tabs 39 associated with the end ports 23 of the casing C. Proper location of each insert with respect to the mechanism centerline is provided by engagement of a generally cylindrical locating surface 40 formed on each of the inserts. These surfaces 40 are disposed in overlying relation to appropriately formed shoulders located on the interior surface of the walls 11. By virtue of this arrangement, the inserts are fixed for rotation with the mechanism casing and frictional engagement between the clutch members 35 and conical seat surfaces of the inserts is effective to resist free differential action.

The clutch members 35 and inserts 36 are maintained in a predetermined initial frictional engagement by the biasing arrangement P. A biasing arrangement generally surrounds the transverse pinion pin 31 and includes a pair of gear contacting members 35. A plurality of compressed coil springs 47 extend longitudinally between the gear contacting members 45 and urge them axially toward the transverse walls 11. This axial loading is transmitted to the side gears 27 which in turn urge the clutch members 35 into frictional engagement with the inserts 36. As is well known, this initial frictional engagement is increased generally as a function of torque input to the mechanism during differential action. This is a result of the separating forces acting upon the side gears 27 which urge the gears toward the clutch members 35 and provide a cumulative increased engagement of the clutches.

In accordance with the present invention and as illustrated in FIGURES 1 through 3 the lubrication supply arrangement L is connected to the mechanism D. This arrangement is effective to deliver adequate supplies of lubricant to the cavity 16 of the mechanism casing to insure proper lubrication and cooling of the internal elements of the mechanism even under severe operating conditions. The lubricant supply arrangement L includes a base plate 49 disposed in overlying relation to the side port 17. The base plate is provided with a pair of oppositely disposed protruding tabs 51 which extend beyond the periphery of the base plate. In the assembled condition the outer ends of the tabs 51 are disposed within the slots 20 of the casing C and secure the base plate to the casing.

Any suitable arrangement for securing the base plate to the casing may be used. In this regard the base plate may be held in place with fasteners such as bolts, screws or rivets. Also the tabs 51 may be formed integrally with the base plate or may be made of separate elements without departing from the scope of the invention.

The base plate 49 of the illustrated embodiment is curved to conform with the configuration of the cylindrical wall 15 of the mechanism casing. However, a flat plate may be used which is flexed to conform with the wall configuration at assembly.

The base plate is provided with a plurality of apertures 53 which are generally rectangular and elongated in a direction parallel to the mechanism centerline. Each aperture is therefore defined by a pair of generally parallel longitudinal edges 55 and a pair of generally parallel transverse edges 56. In the embodiment illustrated in FIGURES 1 through 3, two parallel rows of apertures are provided with the apertures of one row being slightly longer in the direction of the mechanism centerline than the length of the apertures in the other row.

The lubrication arrangement L further includes a series of lubricant scoops 54 each one of which is disposed in overlying relation to one of the apertures 53. These scoops extend outwardly in a direction away from the casing C and are formed obliquely to the base plate surface. The scoop associated with each aperture 53 is connected to the base plate along one longitudinal edge 55 of the aperture.

The apertures and lubricant scoops may be conveniently constructed by forming slots defining three edges of the apertures in a base plate blank and bending the tabs so defined upwardly from the base plate blank to form the scoops. Alternatively, separate scoops may be secured in overlying relation to the apertures 53.

When the arrangement L is assembled to the casing C, the base plate 49 is positioned in a manner such that the lubricant scoops extend in the direction of rotation of the casing which is most frequently experienced under operating conditions. The differential mechanism, in its installed position as a component of a drive axle system is normally positioned within a surrounding housing which retains substantial quantities of lubricant. As the differential mechanism of the illustrated embodiment is rotated in this described environment, the lubricant scoops are effective to urge the lubricating fluid from the surrounding housing and into the cavity 16 through the apertures 53. By this arrangement a positive delivery of lubricant to the internal elements of the differential mechanism is provided and adequate supplies of lubricant are available for lubrication and cooling.

Referring to FIGURE 4 a slightly modified form of lubricant scoop is illustrated. In this embodiment a base plate 49a is provided which includes apertures 53a similar to the apertures 53 of the embodiment of FIGURES 1 to 3. Scoops 54a are provided which extend obliquely outwardly from the base plate 49a in a direction away from the casing (not shown) of the differential mechanism. Generally parallel spaced apart triangular side walls 57 extend from the scoops 54a to the base plate 49a and connect to the base plate along the transverse edges 56 of the apertures. With this arrangement lateral movement of lubricant contacted by the scoops 54a is prevented adding to the delivery capabilities of the arrangement.

Figure 5:
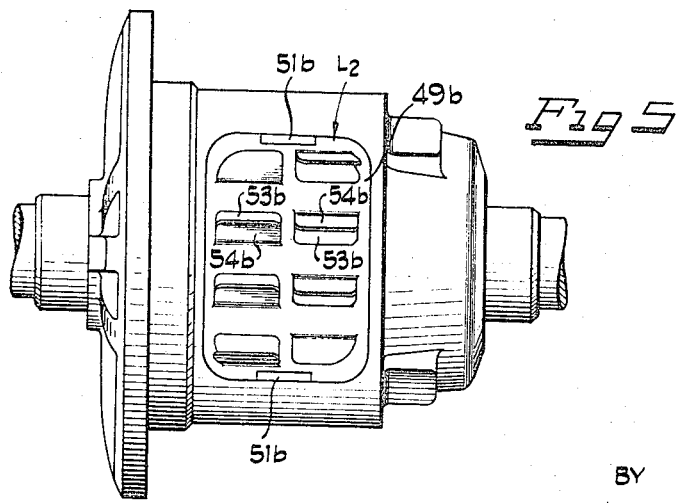
FIGURE 5 is a plan view of a differential mechanism on a reduced scale illustrating another modified form of the invention.

Referring now to FIGURE 5, there is shown a slightly modified form of the invention.

In the illustrated embodiment a lubrication arrangement generally designated $L_2$ is provided in operative association with a differential mechanism D. The lubrication system $L_2$ includes a base plate 49b which includes a pair of oppositely disposed tabs 51b which secure it in overlying relation to the side port opening of the mechanism. The base plate is provided with apertures 53b which allow entry of lubricant into the internal cavity of the mechanism casing. Lubricant scoops 54b which extend obliquely from the base plate surface are provided in overlying relation to each of the apertures 53b. In this embodiment two rows of apertures and lubricant scoops are provided. The length of the apertures and lubricant scoops in a direction parallel to the mechanism centerline in each row is approximately equal, and, the scoops are connected to the base plate adjacent one elongated edge in one row and adjacent the opposite elongated edge in the other row. By this arrangement delivery of lubricant by action of the lubrication arrangement $L_2$ is assured, regardless of the direction of rotation of the differential mechanism.

As can be readily appreciated a lubrication arrangement has been provided which is effective to deliver adequate quantities of lubricant to the internal elements of a differential mechanism to provide lubrication and cooling necessary for prolonged service life under extreme operating conditions.

Various of the features of the invention have been particularly shown and described in connection with the

What is claimed is:

1. A limited slip differential mechanism adapted to be disposed in a surrounding housing containing a quantity of lubricant, said mechanism comprising a rotatable differential casing adapted to receive an input torque and defining an internal cavity, said casing having at least one side port providing access to said cavity, means in said casing adapted to transfer torque to a pair of relatively rotatable coaxially aligned output shafts while allowing relative rotation between the shafts, means in said casing adapted to retard relative rotation between the output shafts, and a lubrication delivery arrangement connected to said casing to deliver lubricant from the surrounding housing to said cavity including a base plate overlying said side port and having at least one aperture formed therein and a lubricant scoop secured to said base plate adjacent said aperture and extending outwardly of said casing in overlying relation to said aperture.

2. A limited slip differential mechanism as claimed in claim 1 wherein said base plate includes a plurality of said apertures each of which is defined by a pair of spaced apart generally parallel longitudinal edges and a pair of spaced apart generally parallel transverse edges and a plurality of lubricant scoops each one of which overlies one of said apertures each said scoop being secured to said base plate adjacent one longitudinal edge of said associated aperture.

3. A limited slip differential mechanism as claimed in claim 2 wherein said scoops are integrally formed with said base plate.

4. A limited slip differential mechanism as claimed in claim 2 wherein said apertures are disposed in a plurality of rows and said scoops of each said row extend outwardly of said casing and obliquely to said base plate in a single direction.

5. A limited slip differential mechanism as claimed in claim 2 wherein said apertures are disposed in a plurality of rows and said scoops of one said row extend outwardly of said casing and obliquely to said base plate in a direction opposite to the scoops of another of said rows.

6. A limited slip differential mechanism as claimed in claim 2 wherein said scoops include spaced apart generally parallel side walls extending from each said scoop to said base plate, with one of said side walls of each said scoop being disposed adjacent one of said transverse edges of each said aperture.

7. A limited slip differential mechanism as claimed in claim 1 wherein a portion of said side port of said casing is defined by a pair of spaced apart, generally parallel walls, each said wall includes a slot elongated in a direction generally parallel to the centerline of said casing and wherein said lubrication arrangement includes means securing said base plate to said casing, said means including a pair of oppositely disposed protruding tabs extending beyond the periphery of said base plate into said slots of said casing.

8. A lubrication supply arrangement for a rotatable differential mechanism including a casing defining a cavity and including at least one side port providing access to the cavity, said arrangement including a base plate adapted to overlie the side port, said base plate including at least one aperture, said aperture being defined by a pair of generally longitudinal edges generally parallel to the axis of rotation of said mechanism and a pair of generally transverse edges, and a lubricant scoop disposed in overlying relation to said aperture, said scoop being secured to said base plate adjacent one longitudinal edge of said aperture.

9. A lubrication supply arrangement for a rotatable differential mechanism as claimed in claim 8 wherein said base plate includes a plurality of apertures disposed in a plurality of rows, each said aperture including one of said lubricant scoops, said scoops of each said row extending outwardly of said casing and obliquely to said base plate in a single direction.

10. A lubrication supply arrangement for a rotatable differential mechanism as claimed in claim 8 wherein said base plate includes a plurality of apertures disposed in a plurality of rows, each said aperture including one of said lubricant scoops, said scoops of one of said rows extending outwardly of said casing and obliquely to said base plate in a direction opposite to the scoops of another of said rows.

11. A lubrication arrangement as claimed in claim 8 wherein a pair of oppositely disposed protruding tabs extend beyond the periphery of said base plate said tabs being adapted to secure said base plate to the casing.

References Cited

UNITED STATES PATENTS

| 1,529,942 | 3/1925 | Bradley | 74—711 |
| 2,997,897 | 8/1961 | Brownyer | 74—711 |
| 3,040,600 | 6/1962 | Mueller | 74—711 |
| 3,138,222 | 6/1964 | Dames et al. | 184—11 |

ARTHUR T. McKEON, *Primary Examiner.*

U.S. Cl. X.R.

184—13; 74—710.5